United States Patent [19]

van Gennip

[11] 4,375,485
[45] Mar. 1, 1983

[54] PROCESS FOR PREPARING WHIPPING CREAM AND WHIPPING CREAM PRODUCTS

[75] Inventor: Adrianus H. M. van Gennip, Boxtel, Netherlands

[73] Assignee: DMV-Campina B.V., Veghel, Netherlands

[21] Appl. No.: 295,011

[22] Filed: Aug. 21, 1981

[30] Foreign Application Priority Data

Aug. 22, 1980 [NL] Netherlands ............... 8004765

[51] Int. Cl.³ .............................................. A23C 13/14
[52] U.S. Cl. .................................... 426/570; 426/580; 426/586; 426/613
[58] Field of Search ............... 426/570, 583, 588, 613, 426/572

[56] References Cited

U.S. PATENT DOCUMENTS 2,137,899  11/1938  Phelps .................. 426/570
3,468,671   9/1969  Bratland ............... 426/570
3,505,077   4/1970  Bratland ............... 426/570
3,607,301   9/1971  Bratland ............... 426/570
3,656,972   4/1972  Blomberg .............. 426/570
3,785,831   1/1974  Willock ................ 426/570
3,787,210   1/1974  Wingerd et al. ........ 426/570
4,251,560   2/1981  Dell et al. ............ 426/570

Primary Examiner—Jeanette M. Hunter
Attorney, Agent, or Firm—Scully, Scott, Murphy & Presser

[57] ABSTRACT

A process for preparing instantly whippable whipping cream and whipping cream products with increased content of surfactants, whereby butter fat and lactic acid are separated from milk and/or milk products and a surfactant is prepared therefrom which consists of lactic acid esters of monoglycerides or of mixtures of lactic acid esters of monoglycerides with monoglycerides, mixing said surfactants with butter fat and emulsifying the fatty mixture in a milk protein and milk sugar containing solution.

7 Claims, No Drawings

PROCESS FOR PREPARING WHIPPING CREAM AND WHIPPING CREAM PRODUCTS

The invention relates to a process for preparing instantly whippable whipping cream and whipping cream products with increased content of surfactants.

Such a process is described in Dutch patent application No. 7904291, wherein it is described that whipped cream with improved properties can be obtained by adding to whipping cream emulsifiers on the basis of partial glyceride and polyglyceride esters, wherein the ratio of saturated lower and unsaturated fatty acid particles complies with a given mathematical formula. The ratio of fatty acid radicals in butter fat complies with this formula.

The drawback going with this process is that the raw material whipping cream is perishable and therefore has to be processed in fresh condition. Also the resulting product is perishable and therefore has to be consumed either immediately after preparation or be delivered sterilized in an infection-free package.

Imitations of whipped cream, indicated as whipped-topping, are prepared in powder form by emulsifying a mixture of *fats* and *emulsifiers* in a solution containing inter alia protein and sugars and by drying the emulsion. As emulsifier are used thereby esters of glycerol with higher fatty acids and other acids including lactic acid.

These whipped-toppings, as a result of their nature and preparation method, are much less sensitive to deterioration of raw materials and end products and moreover they can be whipped to a substantially higher volume than conventional whipped cream, without the risk of overwhipping (butterformation). A drawback of the commercially available whipped-toppings, however, is that they clearly deviate as regards taste and other organoleptical properties from a dairy product such as whipped cream.

It has now been found that these drawbacks do not occur if butter fat and lactic acid are separated from milk and/or milk products and when a surfactant is prepared therefrom which comprises lactic acid esters of monoglycerides or mixtures of lactic acid esters of monoglycerides with monoglycerides, while mixing these surfactants with butter fat and emulsifying the fatty mixture in a milk protein and milk sugar containing solution. The raw materials for these surfactants can be obtained by splitting anhydrous butter fat into glycerol and a fatty acid mixture. Lactic acid may be recovered by fermentation of the milk sugar in milk, whey or resulting products such as ultrafiltrates of milk and whey or other milk sugar containing liquids. According to conventional methods there can be prepared from these raw materials surfactants of the type lactic acid ester of monoglyceride. Likewise such substances can be prepared from butter fat fractions with different melting points as these are commercially available. The resulting substances may be mixed with cream, unmodified butter fat or fractionated butter fat and a thus obtained fat mixture is mixed with a milk protein and milk sugar containing solution, after which an emulsifying step follows for obtaining a liquid whipping cream product.

The above solutions may be composed of conventional milk protein products and milk sugar.

Thereby soluble milk proteins may be used, such as sodium caseinate, potassium caseinate or calcium caseinate, which are obtained by separating protein through acidification or enzymatic coagulation from skimmed milk while converting said protein again into a soluble product. Also protein concentrates obtained by ultrafiltration or diafiltration of milk and so-called coprecipitates, which have a higher content of lactalbumin and lactoglobulin than the caseinates, may be utilized.

Crystalline lactose or whey powders, such as desalted whey powder and deproteinized whey powder or by-products of ultrafiltration of milk or whey and comparable materials rich in milk sugar provide the milk sugar components required for the process according to the invention.

A particular advantage of the invented process is that all raw materials originate from milk and yet are commercially available with keeping qualities, so that the manufacture of whipped cream products can be effected independently of seasonal or regional limitations in the availability of raw materials. Upon fluctuation in the market prices, these raw materials can be purchased when the prices are low and they are purchased in a form which can be transported at relatively low cost and they are processed in a region, such as in the tropics or in the polar regions, where no fresh dairy products are available. There is then obtained a whipping cream product that can be instantly processed or in dry form be rendered preservable for an unlimited period of time.

It has been found that thus obtained products can be properly whipped to a whipped cream but moreover a considerably higher percentage of overrun achieved then with a conventional cream, the products are overwhipped and can be subjected repeatedly to a whipping operation without adversely affecting the quality of the whipped cream. It has also been found that these superior properties can also be obtained if the product before whipping is dried to a powder. After dissolving such a powder in water or milk an excellently whippable cream is obtained. It has been surprisingly found hereby that the fat content may vary within the ranges of about 5 weight % and e.g. 40 weight % or higher, i.e. within much broader ranges than was hitherto possible for whipping cream products.

The process according to the invention for preparing whipping cream, whipping cream products and whipping cream powders may be further explained on the basis of the following examples.

EXAMPLE I

Preparing of used emulsifiers.

Milk is separated by centrifugation into cream and skimmed milk. From the skimmed milk casein was separated by acidification, which was converted into sodium caseinate, while from the whey milk sugar was separated through evaporation and crystallization. The cream was processed to anhydrous butter oil. A part of this butter oil was saponified with a caustic potash solution, after which glycerol was separated by fractionated distillation.

The butyric acids and glycerol were extracted with lactic acid, by means of ion exchange, from acidified whey, added in a ratio butter fat acid mixture: glycerol:-lactic acid of 0.29 mol: 0.27 mol: 0.23 mol.

After evaporation of the accompanying quantity of water a temperature was maintained for 3 hours of 170°–190° C. and a pressure of 7.5 kPa. The cooled mixture was subjected for 1½ hours to a steam distillation.

After washing the residue for removing redundant lactic acid, free fatty acids and free glycerol and drying, there was obtained a colourless product. The resulting emulsifier will be further indicated as GLB. Glycerol with butter oil in the ratio 6:4 was heated for 3 hours at 240° C. in vacuum in the presence of 0.1% Na$_2$CO$_3$ as catalyst. Concentration by molecular distillation provided a product with 90% monoglyceride content. The resulting emulsifier will be further indicated as GMB.

EXAMPLE II

GLB was dissolved to 10% in butter oil and subsequently emulsified in an aqueous solution of lactose and sodium caseinate.

Composition of this emulsion:

5% sodium caseinate
40% butter oil
15% lactose
50% water

After pasteurization at 85° C. and homogenization at a pressure of 20 MPa the mixture after cooling within 3 minutes appeared well whippable, a properly stiff extrudable foam was produced with an overrun of 217%.

EXAMPLE III

GMB and GLB were mixed with butter oil and subsequently directly processed to an emulsion into skimmed milk. Thereby the quantity of GMB was varied. These emulsions were investigated as to their whipping properties.

The preparation of these emulsions was the following:

All dry water-soluble components were dissolved in skimmed milk and heated to 75° C., the butter oil emulsifiers were mixed with butter oil and this oily phase was added to the aqueous phase. After pasteurization at 75° C. for 10 minutes, homogenization 10 MPa, 70° C. cooling took place to 15° C. The cooled emulsion was whipped in a Hobart mixer position 3, for 3 minutes. A properly stiff, well tasting whipped cream with a fat content of 6.6% was produced. Further data are mentioned in table 1.

EXAMPLE IV

GLB and GMB obtained according to example I were mixed with butter oil fractions, as these are commercially available, and subsequently emulsified to a mix and dried. These whipped cream powders were examined as to their whipping properties. The process was the following:

The water-soluble dry components have been dissolved in water and heated to 75° C., the fat mixture was added to the aqueous phase at a temperature of 70° C., end concentration of mix: 55.0%. After homogenization this mix was introduced in a spraying tower and dried. (Temperate inlet air 200° C. and outlet air 82° C.). After cooling of the powder 70 g of powder was whipped with 40 g of sugar and 200 ml of milk. Formulations and results are shown in table 2. There was produced a properly "stiff" whipped cream having particularly nice extruding effects.

Upon use of a mix wherein exclusively GMB was used as emulsifier, a powder was obtained after drying which provided in dissolved state no proper whipped cream.

TABLE 1

Test formulation whipping machine:

| | |
|---|---|
| Emulsion (on dry) | 11% |
| Sugar | 15% |
| Skimmed milk | 74% |

Composition basic emulsion:

| | I | II | III | IV | V |
|---|---|---|---|---|---|
| Sodium caseinate | 10% | 10% | 10% | 10% | 10% |
| Butter oil | 48.5% | 47.5% | 46.5% | 44.5% | 43.5% |
| GLB | 12% | 12% | 12% | 12% | 12% |
| GMB | | 1% | 2% | 4% | 5% |
| Lactose | 29.5% | 29.5% | 29.5% | 29% | 29.5% |
| Overrun | 137% | 235% | 261% | 282% | 311% |
| Penetration | 35mm | 3.8mm | 4.2mm | 3.5mm | 2.7mm |

TABLE 2

Composition of mix:

| | | | | | | |
|---|---|---|---|---|---|---|
| Potassium caseinate | 10% | 10% | 10% | 10% | 10% | 10% |
| Butter oil fraction: | | | | | | |
| Noordam 36° C. | 48% | | | | | |
| Noordam 38° C. | | 48% | | | | |
| Corman 36° C. | | | 48% | | | |
| Corman 36° C. | | | | 48% | | |
| Corman 36° C. | | | | | 48% | |
| Corman 28° C. | | | | | | 48% |
| GLB | 12% | 12% | 12% | 12% | 12% | 12% |
| GMB | 2% | 2% | 2% | 2% | 2% | 2% |
| Lactose | 28% | 28% | 28% | 28% | 28% | 28% |
| Overrun after | | | | | | |
| 3 min. | 270% | 260% | 280% | 160% | 270% | 230% |
| 6 | | 230% | 235% | 228% | 228% | 214% |
| 9 | | 214% | 228% | 211% | 208% | |
| 12 | | 202% | 211% | 208% | 199% | |
| 15 | | 202% | 211% | 211% | 199% | |
| 20 | 230% | 199% | 208% | 205% | 188% | |
| Penetration | 5.0mm | 3.0mm | 1.0mm | 1.5mm | 1.5mm | 1.0mm |

What I claim is:

1. A process for preparing instantly whippable whipping cream and whipping cream products containing surfactants, which comprises separating butterfat and lactic acid from milk or milk products; preparing surfactants of lactic acid esters of monoglycerides or surfactants of mixtures of lactic acid esters of monoglycerides and monoglycerides from the butterfat and the lactic acid; mixing said surfactants with butterfat; and emulsifying the surfactants and butterfat mixture with a solution containing milk protein and milk sugar to form the whipping cream.

2. A process according to claim 1, wherein the whipping cream has a fat content of 5–40%.

3. A process according to claim 1, which further comprises drying the whipping cream to form a dried powder; and dissolving said powder before whipping.

4. A process according to claim 1, which further comprises diluting the whipping cream with milk before whipping.

5. A process according to claim 1, wherein the butter fat mixed with the surfactants is in the form of fractionated butter fat.

6. A process according to claim 1, wherein the milk products are in the form of fractionated butter fat and other milky raw materials.

7. A process according to claim 3, wherein the powder is dissolved in milk before whipping.

* * * * *

UNITED STATES PATENT AND TRADEMARK OFFICE
CERTIFICATE OF CORRECTION

PATENT NO. : 4,375,485
DATED : March 1, 1983
INVENTOR(S) : Adrianus H. M. Van Gennip It is certified that error appears in the above-identified patent and that said Letters Patent are hereby corrected as shown below:

Column 4, line 34, "160" should read as --260--.

Signed and Sealed this

Ninth Day of August 1983

[SEAL]

Attest:

GERALD J. MOSSINGHOFF

Attesting Officer     Commissioner of Patents and Trademarks